United States Patent [19]

Wilson

[11] Patent Number: 5,358,285
[45] Date of Patent: * Oct. 25, 1994

[54] STRESS RELIEF GROOVE FOR DRILL PIPE

[75] Inventor: Gerald E. Wilson, Montgomery, Tex.

[73] Assignee: Prideco, Inc., Houston, Tex.

[*] Notice: The portion of the term of this patent subsequent to Feb. 15, 2011 has been disclaimed.

[21] Appl. No.: 182,211

[22] Filed: Jan. 13, 1994

Related U.S. Application Data

[63] Continuation-in-part of Ser. No. 985,832, Dec. 3, 1992, Pat. No. 5,286,069.

[51] Int. Cl.$^5$ .............................................. F16L 13/04
[52] U.S. Cl. .................... 285/114; 285/333; 285/286
[58] Field of Search .............. 285/114, 333, 334, 286; 403/343

[56] References Cited

U.S. PATENT DOCUMENTS

| | | | |
|---|---|---|---|
| 1,714,818 | 5/1929 | Reed | 403/343 X |
| 2,239,942 | 4/1941 | Stone et al. | 285/146 |
| 2,676,820 | 4/1954 | Boice | 285/114 |
| 3,388,935 | 6/1968 | Hjalsten et al. | 403/343 |
| 3,691,882 | 9/1972 | Massey | 82/4 C |
| 4,076,436 | 2/1978 | Slator et al. | 403/343 |
| 4,249,831 | 2/1981 | Sable | 403/343 X |
| 4,430,787 | 2/1984 | Paramore et al. | 403/343 |
| 4,594,020 | 6/1986 | Hughes | 403/343 |
| 4,601,491 | 7/1986 | Bell et al. | 285/334 X |
| 4,760,889 | 8/1988 | Dudman | 175/320 |
| 4,892,337 | 1/1990 | Gunderson et al. | 285/333 |
| 5,040,622 | 8/1991 | Winship et al. | 285/333 X |

*Primary Examiner*—Dave W. Arola
*Attorney, Agent, or Firm*—Vaden, Eickenroht, Thompson, Boulware & Feather

[57] ABSTRACT

A joint of drill pipe is disclosed that has a tube section with upset ends to increase the wall thickness of the tube at its ends and tool joints connected to each end of the tube. Each tool joint has a cylindrical section connected to a weld neck of diameter by a tapered section. The connection between the tapered section and the weld neck has a radius of curvature and the weld neck has a wall thickness equal to that of the upset end of the tube that is welded to the weld neck. An external, stress relief groove is located in the weld neck to increase the fatigue life of the tube section of the drill pipe when the drill pipe is subjected to varying stresses produced by rotating the drill pipe while bent. One end of the relief groove is arcuate and is an extension of the radius of curvature between the tapered section and the weld neck. The groove may be arcuate in cross-section or it may have arcuate end sections with a cylindrical section between the end sections.

13 Claims, 3 Drawing Sheets

STRESS RELIEF GROOVE FOR DRILL PIPE

This application is a continuation-in-part of application Ser. No. 07/985,832, filed Dec. 3, 1992 now U.S. Pat. No. 5,286,069 issued Feb. 15, 1994.

This invention relates to stress relief grooves for pipe generally and in particular to a stress relief groove for increasing the fatigue life of the tube portions of drill pipe.

Fatigue failures in drill pipe are caused by stress reversals produced when the pipe is rotated while bent. These stresses are concentrated in the thin wall section of the drill pipe adjacent the thick upset sections at each end of the tube, i.e., where the thick upset section fades out. Drill pipe today is being subjected to higher and higher stresses with the advent of top drives, deeper wells, and high angle holes. This condition is further aggravated by a more hostile environment with the increasing presence of $H_2S$, $CO_2$, and brine water. Many drilling contractors and oil operators along with the IADC and API have made studies of a vast number of failures. Most of them occurred in the tube adjacent to the almost abrupt change in wall thickness between the tube and the upset end portions of the tube. Slip damage on this section of the tube also contributed to the problem. It has also been observed that rapid deterioration of the internal, plastic coating in this area compounds the problem. Both physical testing and finite element analyses of API drill pipe have shown a high stress concentration on the inside of the tube at the fadeout where the short, abrupt upset blends into the drill pipe wall.

In presently pending application Ser. No. 07/801,969, filed Dec. 3, 1991 and entitled "Method of Internally and Externally Upsetting the End of a Metal Tube", an application owned by the assignee of this application, now U.S. Pat. No. 5,184,495, a method is described for upsetting the end of a drill pipe tube that produces a substantially longer internal conical transition section between the relatively thick internal cylindrical upset section and the nominal tube wall. The length of this transition section measured along the longitudinal axis of the tube is called "Miu". As a result of lengthening this Miu section, the fatigue life of the tube is greatly increased. For example, three joints A, B, and C having a relatively short Miu as prescribed by API and three joints D, E, and F having Miu tapers of 6 -11/16", 7¾", and 7¾" were rotated while bent to have a radius of curvature of 173 feet, which is the equivalent to a curvature of 33 degrees per 100 feet. Joints A, B, and C failed after 237,618, 235,296, and 205,884 cycles respectively. Joints D, E, and F failed after 382,666, 462,028, and 569,664 cycles respectively. These tests show that lengthening the Miu taper on internal and external upset drill pipe will increase the fatigue life of the tube. This application is incorporated herein by reference.

Similar testing of pipe having a long tapered section connecting the tube to the upset shows a great reduction in stresses in the tube section adjacent the tapered section on the inside of the tube section. As a matter of fact, the stress is lower on the inside of the tube than it is on the outside of the tube. This solves some problems when it comes to inspection. With today's inspection techniques, it is very difficult to find a crack on the inside of plastic coated drill pipe. Finding cracks on the outside of the tube will be much easier. It is also easier to apply a uniform coating of plastic to a long gentle taper than to apply such a coating to a short high angle taper. It is believed this will add considerable life to the drill pipe.

In the past, stress relief grooves have been machined in connections on drill collars and thick wall drilling tools to reduce bending stresses in the connections. Today, these features are standard practice, and they seem to work very well. The reason being that drill collars and thick wall drilling tools have a tendency to bend in the connections. Material has been machined away to make the connections, so the connections have less resistance to bending than the thick wall body to which they are connected. Stress relief grooves in the connections reduces their stiffness and allows the connections to flex, thereby reducing the bending stresses. This increases the fatigue life of connections.

In drill pipe, the problem is just the opposite of drill collars. Drill pipe does not bend in the thick wall upset sections and tool joints—it bends in the thin wall tube at or near the runout or fadeout of the upset. Looking at the tube upset, there is no place for a stress relief groove because of the weld area and the heat effect zone. Maximum upset wall thickness is required in this area to ensure that the weld is stronger than the drill pipe tube. This leaves the tool joint side of the weld to consider. This is an ideal location for a groove, since the metal in the tool joint is very carefully controlled to have a minimum yield of 120,000 psi (828 MPa). Therefore, this section is uniformly much stronger than the drill pipe tube because of the larger cross-sectional area. Because the wall thickness and strength of the material remain constant, the effect of a stress relief groove in this area will be substantially constant.

To provide space for the groove, the weld neck should be extended approximately 2½ inches. This keeps the relief groove away from the weld and the heat effect zone. A relief groove at this point reduces the stiffness in the upset and allows some flexing that reduces the bending stresses in the drill pipe tube and the weld area. In parent application Ser. No. 07/985,832, it was stated that the extension of the weld neck by 2½ inches also served to keep the relief groove out of the radius of the tool joint. As will be discussed below, it is now clear that having the taper of the tool joint form a portion of the arcuate section of the groove adjacent the enlarged section of the tool joint is beneficial.

It is an object of this invention to increase the fatigue life of a joint of drill pipe having a tube section with upset ends and tool joints welded to the upset ends of the tube section by locating a stress relief groove in the weld neck of the tool joint.

It is a further object of this invention to increase the fatigue life of a joint of drill pipe by locating a stress relief groove in the weld neck of the tool joint with an extension of the radius between the tapered section and the weld neck forming a portion of the groove with the groove being arcuate or arcuate at each end and cylindrical in between.

It is a further object and feature of this invention to increase the fatigue life of a joint of drill pipe by locating such a stress relief groove in the weld neck of the tool joint with the ratio of the cross-sectional area below the groove divided by the cross-sectional area of the tube providing a safety factor of about 1.6.

It is a further object and feature of this invention to provide such a stress relief groove to a joint of drill pipe wherein the groove is arcuate and about ⅛ to ¼" deep.

It is a further object and feature of this invention to provide a stress relief groove for the tube section of a joint of drill pipe that is located in the weld neck of the tool joint that is welded to the tube and includes a cylindrical section with arcuate sections on opposite sides of the cylindrical section.

It is a further object and feature of this invention to provide a stress relief groove for the tube section of a joint of drill pipe that is located in the weld neck of the tool joint and includes a cylindrical section with arcuate sections on opposite sides one of which is an extension of the radius between the tool joint and the weld neck.

It is a further object of this invention to provide such a stress relief groove that extends substantially between the radius of the tapered section of the tool joint and the heat affected zone to reduce the section modulus and increase the flexibility of the weld neck and decrease the stress in the tube section of the drill pipe.

It is a further object of this invention to provide such a joint of drill pipe with an Miu of 4½" or greater and a stress relief groove located in the weld neck of at least one of the tool joints welded to the upset ends of the pipe.

These and other objects, advantages, and features of this invention will be apparent to those skilled in the art from a consideration of the attached drawings and appended claims.

A "joint of drill pipe" as used in this specification shall mean a tube having relatively thin walls, the ends of which having been upset to increase the wall thickness, with tool joints connected at each end. The female tool joint is called a "box" and the male tool joint is called a "pin".

IN THE DRAWINGS

Figure 7:
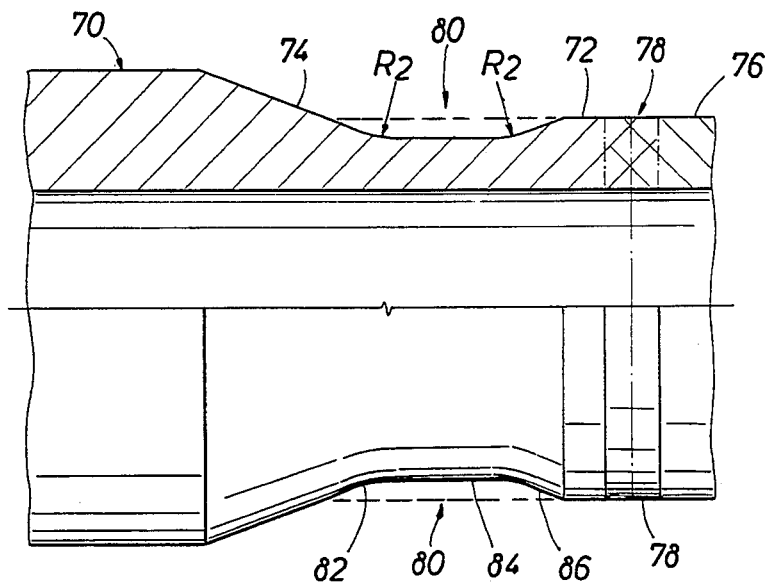

FIG. 7 is a view partly in section and partly in elevation of a tool joint box having an 18° taper provided with another embodiment of the improved stress relief groove of this invention where one side of the groove is an extension of the radius between the 18° taper and the weld neck and the center of the groove is cylindrical to allow the length of the groove to be extended without increasing its depth.

Figure 8:
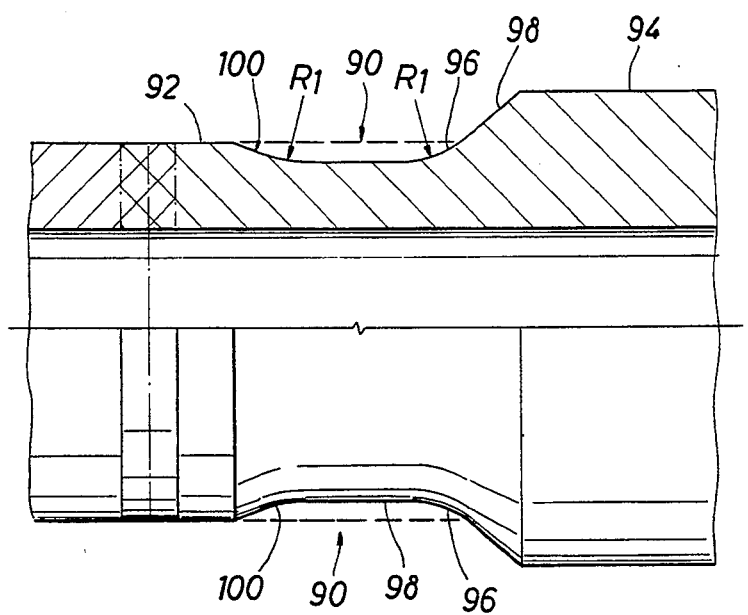

FIG. 8 is a view partly in section and partly in elevation of a tool joint pin with a 35° taper provided with the improved stress relief groove of FIG. 7 where one side of the groove is an extension of the radius between the 35° taper and the weld neck and again the center of the groove is cylindrical to allow the length of the groove to be extended without increasing its depth.

Figure 9:
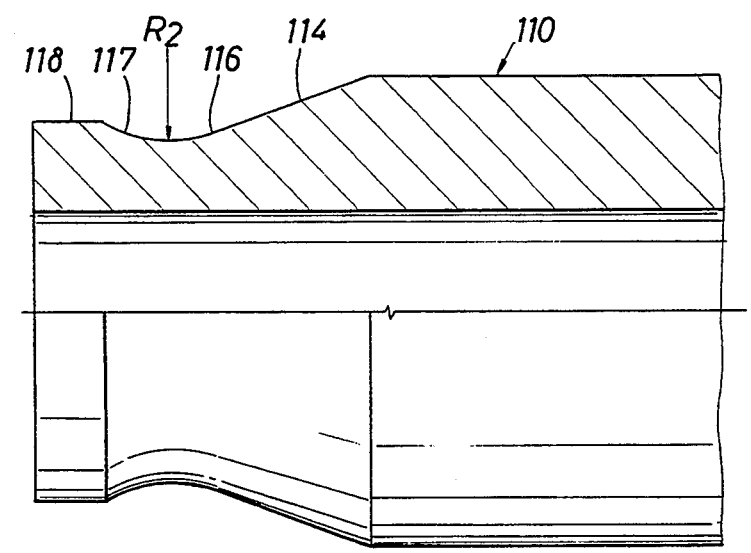

FIG. 9 is a view partly in section and partly in elevation of a tool joint pin provided with an arcuate groove of this invention where one side of the groove is an extension of the radius between an 18° taper of the pin and the weld neck.

Figure 1:
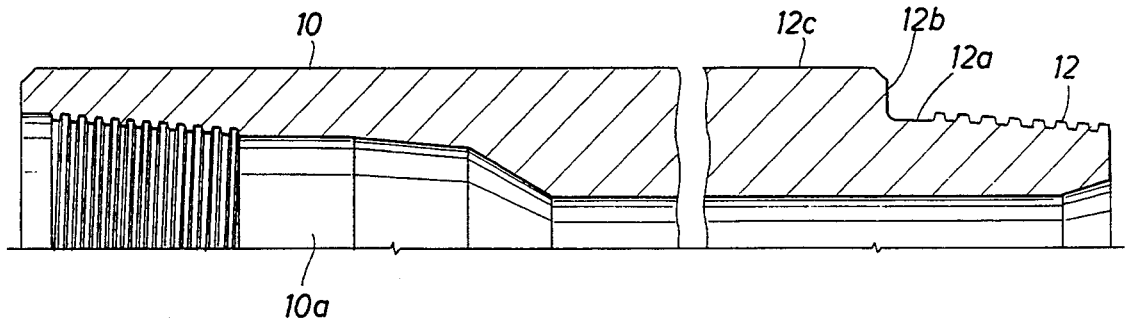
FIGS. 1 and 2 are sectional views through one-half of a tool joint box and one-half of a tool joint pin respectively showing the API approach to stress relief grooves for drill collars or thick wall drilling tools.
Figure 2:
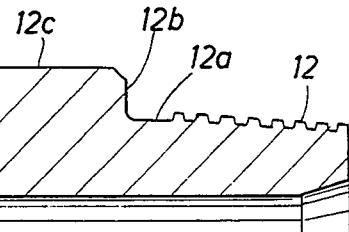

FIGS. 1 and 2 show the connection stress relief features for drill collars as specified in API Spec 7: Rotary Drilling Equipment, pages 19, 20, and 21. Another alternate box stress relief feature is shown on page 21 but is not shown in the drawings because the "Boreback Design" shown in FIG. 1 has proven more reliable in actual service conditions and is recommended. The boreback stress relief feature is the extension of bore 10a of the box a substantial distance from the threads before reducing the bore to a diameter equal to that of the drill collar.

Stress relief groove 12a on the pin is located between the threads and shoulder 12b. A stress relief groove is sometimes cut in cylindrical surface 12c of the pin.

Figure 3:
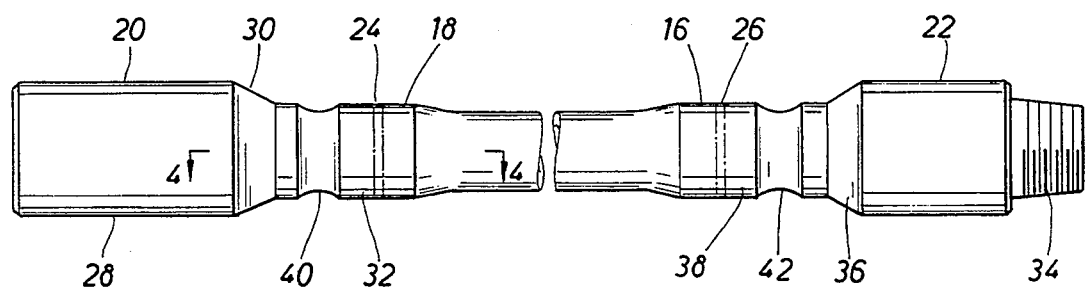
FIG. 3 is a view, in elevation, of a joint of drill pipe provided with two stress relief grooves in accordance with this invention.

FIG. 3 is a view in elevation of a drill pipe joint having tube section 14 that is externally and internally upset at each end to provide sections 16 and 18 of increased outside diameter and decreased inside diameter, producing increased wall thickness. The upset ends of the tube are welded to tool joints 20 and 22 by welds 24 and 26. Tool joint 20 is a box connection comprising cylindrical section 28 that is internally threaded. Tapered section 30 provides a transition zone between larger diameter cylindrical section 28 and weld neck 32. Tapered section 30 normally has an 18° taper to provide a shoulder for engaging elevators to support the pipe as it is being lowered into or pulled from the well bore. Tool joint 22 is a pin connection having external threads 34, tapered section 36, similar to tapered section 30 of the box, and weld neck 38. Stress relief grooves 40 and 42 in accordance with this invention, are located in the weld necks of each tool joint adjacent welds 24 and 26.

Figure 5:
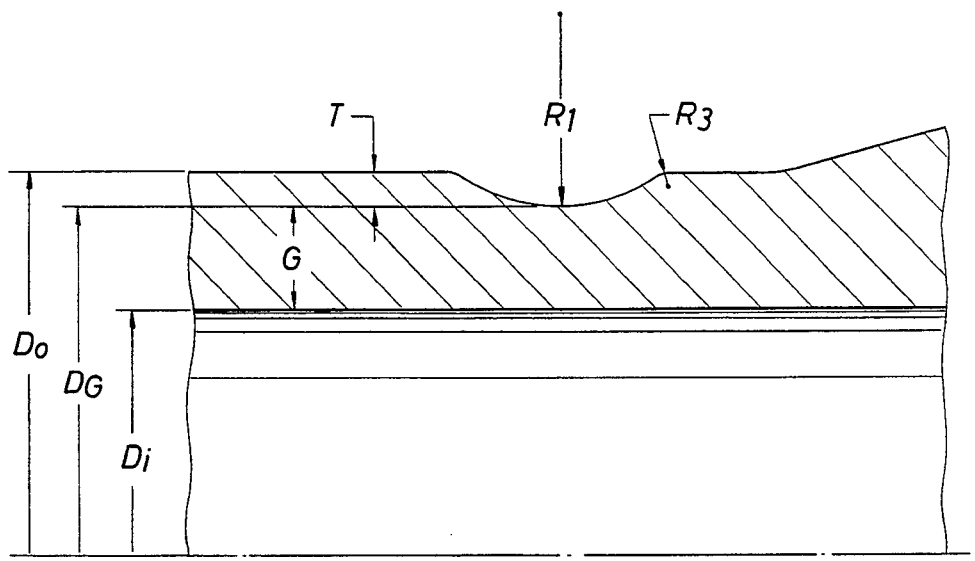
FIG. 5 is a view showing the preferred shape of the stress relief groove of this invention.

Set out below in Table 1 are the preferred dimensions for the groove in drill pipe ranging from 4" O.D. to 5½" that will provide a safety factor of approximately 1.6. The Table gives dimensions for the groove with both API and internal extra long tapers for both internal upset (I.U.) and internal, external upset (I.E.U.) drill pipe. The location of each dimension in the Table is shown in FIG. 5.

TABLE 1

| | STRESS RELIEF GROOVE DIMENSIONS FOR SAFETY FACTOR OF APPROXIMATELY 1.6 | | | | | |
|---|---|---|---|---|---|---|
| Drill Pipe Size | $D_i$ Upset I.D. | $D_o$ Upset O.D. | $D_G$ Groove Dia. | G Groove Depth | T Groove Wall Thick. | Groove Area |
| 4" 14.0 lbs/ft. I.U. | 2-11/16 | 4-1/8 | 3.8772 | 0.1239 | 0.5949 | 6.1341 |
| I.D. = 3.340 | 2-7/16 | 4-1/8 | 3.7083 | 0.2083 | 0.6354 | 6.1341 |
| | API 2-5/8 | 4 | 3.8342 | 0.0829 | 0.6046 | 6.1341 |
| 4½" 16.60 lbs. I.E.U. | 3 | 4-11/16 | 4.2482 | 0.2197 | 0.6241 | 7.1056 |
| I.D. = 3.826 | API 2-7/8 | 4-21/32 | 4.1609 | 0.2476 | 0.6430 | 7.1056 |
| | 2-3/4 | 4-11/16 | 4.0755 | 0.2903 | 0.6628 | 7.1056 |
| 4½" 20 lbs. I.E.U. | 2-3/4 | 4-11/16 | 4.3415 | 0.173 | 0.6708 | 8.8641 |
| I.D. = 3.640 | API 2-13/16 | 4-11/16 | 4.3814 | 0.1531 | 0.7845 | 8.8641 |

TABLE 1-continued

STRESS RELIEF GROOVE DIMENSIONS FOR SAFETY FACTOR
OF APPROXIMATELY 1.6

| Drill Pipe Size | $D_i$ Upset I.D. | $D_o$ Upset O.D. | $D_G$ Groove Dia. | G Groove Depth | T Groove Wall Thick. | Groove Area |
|---|---|---|---|---|---|---|
| | 2-1/2 | 4-11/16 | 4.1876 | 0.250 | 0.8438 | 8.8641 |
| 5" 19.5 lbs. I.E.U. | 3-1/4 | 5-1/8 | 4.625 | 0.250 | 0.6875 | 8.5039 |
| I.D. = 4.276 | API3-9/16 | 5-1/8 | 4.8496 | 0.1377 | 0.6436 | 8.5039 |
| 5" 25.6 lbs. I.E.U. | 3-1/4 | 5-1/8 | 5.0072 | 0.060 | 0.8786 | 11.396 |
| I.D. = 4.000 | | | | | | |
| 5½ 21.9 lbs. I.E.U. | 3-1/2 | 5-11/16 | 4.9207 | 0.3834 | 0.7104 | 9.3962 |
| I.D. = 4.778 | API3-13/16 | 5-9/15 | 5.147 | 0.2077 | 0.6676 | 9.3962 |
| 5½ 24.7 lbs. I.E.U. | 3-1/2 | 5-11/16 | 5.0851 | 0.2389 | 0.7926 | 10.6883 |
| I.D. = 4.670 | API3-13/16 | 5-9/16 | 5.3051 | 0.1290 | 0.7463 | 10.6883 |

Figure 6:
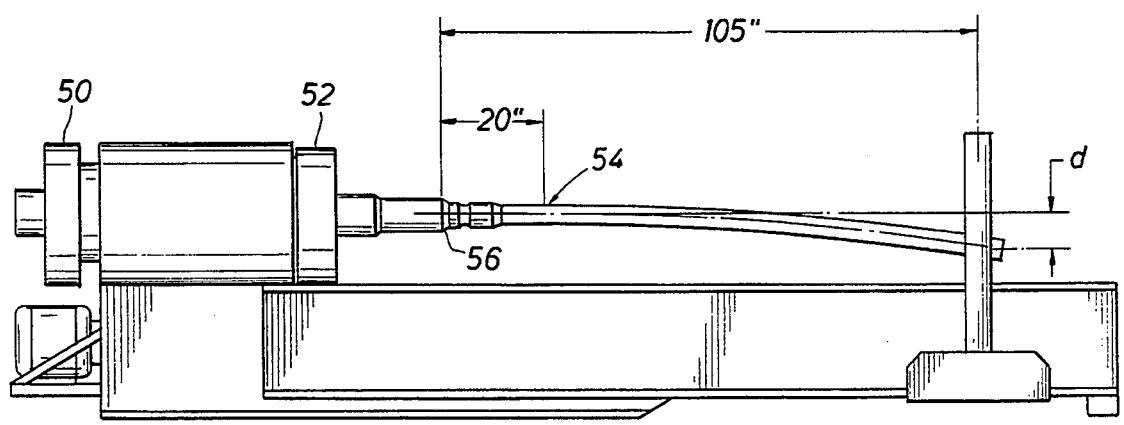
FIG. 6 is a side view in elevation of the fatigue test stand used to test the fatigue life of drill pipe specimens.

To accommodate the grooves set out in Table A above, the weld necks had to be extended approximately 2½". Initial test work with the groove of FIG. 5, where $R_1$ is equal to 1¼" and $R_3$ equal to ¼", was performed using the apparatus shown in FIG. 6. A lathe was used having back chuck 50 and front chuck 52. 5" 19.5 lbs./ft. I.E.U. S-135 drill pipe with a nominal wall of 0.362" (9.19 mm) was selected for the testing program. All the test samples were cut 120" long. An attempt was made to select long taper upsets with equivalent Miu lengths so this would not be a variable. All the samples were machined so the centerline of the box connections were concentric with the centerline of the tube ends within 0.025 of an inch (0.635 mm). Strain gauge 54 was attached to the outside surface of each sample at the same location—20" (508 mm) from the intersection of the tool joint O.D. and 18° elevator shoulder 56. This located the strain gauges on the tube section of the drill pipe sample. At 105" from the large diameter of taper 56, each test sample was deflected a distance d that was equal to 2-3/16" to simulate a hole curvature of 33°/100 ft. that was used in previous tests. All fatigue tests on the test samples were performed with the same deflection near the end of the pipe to simulate drilling through the same hole curvature for comparison purposes. Strain gauge data show that with the same deflection, the stress in the samples having weld neck relief grooves was approximately 1,040 psi (7.17 MPa) less than the samples discussed above that had only the long taper upset. Three specimens with the weld neck stress relief grooves of FIG. 5 were tested to failure in the same type of rotating cantilever beam fatigue machine. The results of these tests are shown in Table 1. Table 2 shows the mechanical properties of the specimens. The fatigue test results shown in Table 1 can be compared to previous fatigue test results for the API upsets and the long taper upsets in Table 3, which is also set out below.

TABLE I

FATIGUE TEST DATA
Long Taper Upset Combined With
Weld Neck Stress Relief Groove

| TEST NUMBER | TAPER LENGTH MIU | | RADIUS R | | CYCLES to FAILURE |
|---|---|---|---|---|---|
| | Inches | (mm) | Inches | (mm) | |
| 1 | 6-3/8 | (162) | 48 | (1,219) | 1,051,280 |
| 2 | 6 | (152) | 48 | (1,219) | 838,276 |
| 3 | 5-3/4 | (146) | 38 | (965) | 690,356 |

TABLE 2

MECHANICAL PROPERTIES
Long Taper Upset Combined With
Weld Neck Stress Relief Groove

| TEST SAMPLE NO. | TENSILE PSI (MPa) | MIN YIEL PSI (MPa) | ELONG. % | IMPACT ft-lbs (Joules) | O.D. inches (mm) | WALL inches (mm) |
|---|---|---|---|---|---|---|
| 1 | 152,949 (1,055) | 142,619 (983) | 20.9 | 50 (68) | 5.003 (127.1) | 0.365 (9.27) |
| 2 | 148,869 (1,026) | 138,505 (955) | 19.6 | 49 (66) | 5.015 (127.4) | 0.349 (8.86) |
| 3 | 149,944 (1,034) | 138,858 (957) | 20.9 | 50 (68) | 5.005 (127.1) | 0.371 (9.42) |

TABLE 3

PREVIOUS FATIGUE TEST DATA

| TEST NUMBER | TYPE UPSET | TAPER LENGTH Miu | | RADIUS R | | CYCLES to FAILURE |
|---|---|---|---|---|---|---|
| | | inches | (mm) | inches | (mm) | |
| 1 | API | 2½ | (64) | 6.5 | (165) | 235,296 |
| 2 | API | 2½ | (64) | 9.0 | (229) | 237,618 |
| 3 | API | 2-5/16 | (59) | 5.0 | (127) | 205,884 |
| 4 | Long Taper | 7-3/8 | (187) | 48 | (1,219) | 462,078 |
| 5 | Long Taper | 7-3/4 | (197) | 46 | (1,168) | 569,664 |
| 6 | Long Taper | 6-11/16 | (170) | 40 | (1,016) | 382,666 |

Cycles to failure were averaged for all three types of specimens and a comparison of these is in Table 4. API-—226,300 cycles, long taper 471,500 cycles, and the long taper with weld neck stress relief grooves—860,000 cycles. As can be seen, the long taper upset fatigue life is more than double the fatigue life of the API samples tested and the fatigue life of the weld neck stress relief groove combined with the long taper upset is almost double the fatigue life of the long taper upset and approximately four times the API upset specimens tested.

TABLE 4

FATIGUE TEST AVERAGES

| TYPE OF SPECIMEN | CYCLES to FAILURE |
| --- | --- |
| API UPSET | 226,300 |
| LONG TAPER UPSET | 471,500 |
| LONG TAPER W/WELD NECK STRESS RELIEF GROOVE | 860,000 |

Figure 4:
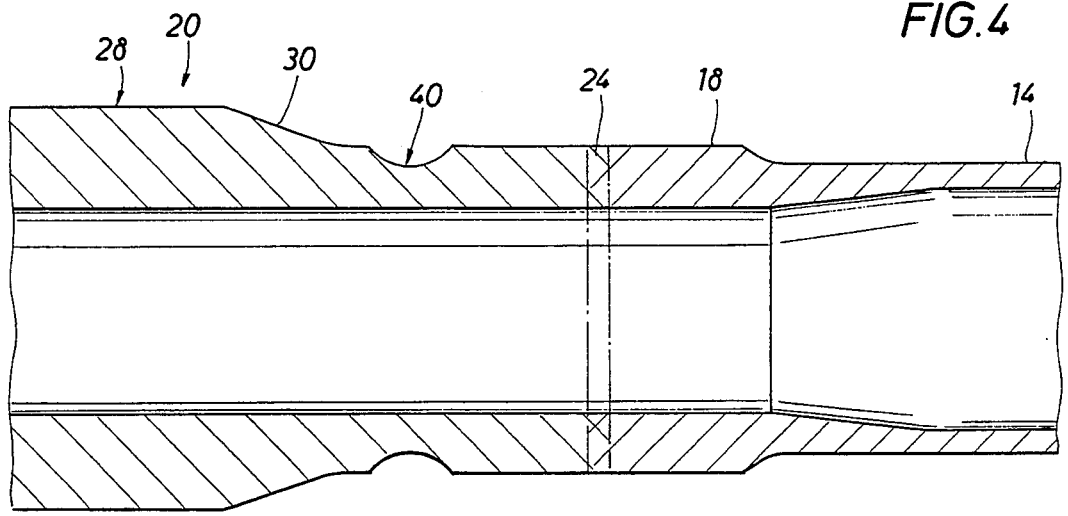
FIG. 4 is a cross-sectional view on an enlarged scale taken along line 4—4 of FIG. 3.

After parent application Ser. No. 07/985,832 was filed on Dec. 3, 1992, a finite element analysis (FEA) was performed on four different models to determine the effectiveness of the extra long taper (Miu) alone and in combination with the stress relief groove shown in FIGS. 3–5. Analysis Model No. 1 was an extra long taper only. Model No. 2 was an extra long taper combined with the relief groove in accordance with the description set out in parent application Ser. No. 07/985,832 (FIGS. 3–5). Model No. 3 was with an extra long taper without a groove, but plus a 2½" longer weld neck. Model No. 4 was an API 3-9/16 I.D. upset with 2.5" long taper with a 2" internal taper radius at fadeout. First, an FEA was performed on the models based on a cantilever arrangement with 2-3/16" displacement at 105" from the edge of the tool joint O.D. A second FEA was conducted based on pure bending with 200,000 in-lbs of bending moment. The results are set out in the Table 5 below where the model numbers refer to the model numbers described above.

TABLE 5

FINITE ELEMENT ANALYSIS CANTILEVER
FEA & PURE BENDING FEA FOR PIN TOOL JOINTS

|  | MODEL NUMBER | MAX. STRESS P.S.I. | LOCATION FROM TONG SPACE IN INCHES | LOCATION |
| --- | --- | --- | --- | --- |
| Cantilever FEA | 1 | 41,881 | 14.90 | O.D. - Fadeout |
|  | 2 | 56,377 | 2.70 | Groove O.D. |
|  |  | 41,459 | 17.44 | O.D. - Fadeout |
|  | 3 | 42,014 | 17.43 | O.D. - Fadeout |
|  | 4 | 42,699 | 9.61 | O.D. - Fadeout |
|  |  | 45,901 | 8.37 | I.D. - Fadeout |
| Pure Bending FEA | 1 | 35,184 | 15.29 | O.D. - Fadeout |
|  | 2 | 40,873 | 2.70 | Groove O.D. |
|  |  | 35,184 | 17.70 | O.D. - Fadeout |
|  | 3 | 35,184 | 17.80 | O.D. - Fadeout |
|  | 4 | 35,611 | 9.70 | O.D. - Fadeout |
|  |  | 37,818 | 8.37 | I.D. - Fadeout |

The final element analysis was limited to tool joint pins since they are generally where the failures occur in a drill string.

The results indicate that the maximum stress occurred at the groove in Model 2, which is the combination of extra long taper and low stress groove of the parent application. The stress was 56,877 psi for the cantilever FEA and 40,873 for the pure bending FEA.

A high stress at the groove in Model 2 is not a serious problem and would not generally affect the fatigue life of the drill pipe because of the extra thick wall section in the weld neck of the tool joint where the groove is located. In addition, the section below the groove is much more capable of resisting higher stresses because of the smooth surface finish that is given to the groove. This reduces the effect of corrosion on the surface of the groove. This smooth surface finish is not present at the fadeout, which is simply whatever the surface finish of the pipe was at the mill. Also, even though the FEA stress appears to be noticeably higher, in the actual fatigue tests, the pipe all failed at the fadeout, which, for the reasons given above, is where the failure would be expected even though there is higher stress at the groove. Further, an individual joint of drill pipe in a pipe string operating in a well bore is never bent like a cantilever beam so the stress produced by a FEA based on the stress produced in a cantilever beam is not a true indication of the stresses produced in actual drilling operations.

Nevertheless, in an effort to reduce the stress at the groove, the groove has been redesigned as shown in FIGS. 7–9 so that one side of the stress relief groove is an extension of the radius of the tapered section of the tool joint into the weld neck.

For example, FIG. 7 shows a tool joint box 70 having weld neck 72 integrally connected thereto. The transition between the smaller diameter weld neck and box 70 is through tapered section 74. The angle of taper is 18°, which is required because that is the taper of the elevators that engage the tapered section and support the pipe. The weld neck is welded to internal/external upset section 76 of a drill pipe tube (not shown) by weld 78.

In accordance with the preferred embodiment of this invention, groove 80 is formed by arcuate section 82 that is an extension of taper 74 that curves into the plane of cylindrical section 84. On the other side of the groove, arcuate section 86 curves outwardly from cylindrical section 84 to the outside diameter of weld neck 72. The groove extends to within about 1" of the end of the weld neck. This spaces the groove far enough from the heat affected zone adjacent the weld so as to not be included in the heat effect zone.

The radius of curvature of the arcuate sections on either side of cylindrical section 84 is preferably about 2½".

Groove 90 in weld neck 92 of tool joint pin 94 is shown in FIG. 8. Arcuate section 96 is an extension of taper 98, which is the taper on the outside surface of the section connecting pin 94 to the weld neck. The taper on the pin is generally 35°.

Arcuate section 96 blends into cylindrical section 98, the other end of which is connected to arcuate section 100 that forms the other arcuate end portion of stress relief groove 90. Here again, radii $R_1$ of the arcuate sections are preferably about 2½" for 5" O.D. drill pipe. Also, the groove is located so that it ends at least about an inch from the end of the weld neck so as to keep the groove away from the heat affected zone.

The grooves of FIGS. 7 and 8 are designed to reduce the section modulus over a fairly long portion of the weld neck to increase its flexibility and thereby reduce the stress created at the fadeout of the internal taper end on the inner surface of the tube portion of the drill pipe, without unduly reducing the strength of the weld neck. The groove of this invention is Model No. 5 and is called a "Modified Groove" in Table 6 that follows.

TABLE 6

SUMMARY OF DRILL PIPE SOLUTIONS 2-3/16" DISPLACEMENT, 105" FROM EDGE OF 6.5" DIA. UPSET 2-3/16" DISPLACEMENT 105" FROM EDGE OF TONG-SPACE

| CONNECTOR | | MODEL NO. | MAXIMUM STRESS (PSI) | LOCATION OF STRESS FROM TONG-SPACE (IN) | LOCATION | DISPLACEMENT AT END OF PIPE (IN) | FORCE @ 105" (LB) | PIPE WALL MC/1 AT MAX. STRESS LOCATION O.D. (PSI) | PIPE WALL MC/1 AT MAX. STRESS LOCATION I.D. (PSI) | STRESS CONCENTRATION FACTOR SCF | 2-3/16" @ END STRESS (PSI) |
|---|---|---|---|---|---|---|---|---|---|---|---|
| PIN | XLT ONLY | 1 | 41881 | 14.90 | O.D. | 2.379 | 2648.0 | 41799 | 35747 | 1.00195 | 38510 |
| | XLT & LO-STRESS WITH GROOVE 4.625" MIN. DIA. | 2 | 56377 | 2.70 | GROOVE O.D. | 2.380 | 2696.1 | 48321 | 41324 | 1.16671 | 51822 |
| | XLT & LO-STRESS WITHOUT GROOVE | | 41459 | 17.44 | O.D. | | | 41359 | 35370 | 1.00242 | 38109 |
| | XLT & LO-STRESS WITHOUT GROOVE API 3-9/16" UPSET, 2.5 TAPER LENGTH, 2 TAPER RADIUS | 3 | 42014 | 17.43 | O.D. | 2.381 | 2732.2 | 41920 | 35850 | 1.00225 | 38605 |
| | | 4 | 42699 | 9.61 | O.D. | 2.376 | 2515.9 | 42048 | 35960 | 1.01548 | 39308 |
| | | | 45901 | 8.37 | I.D. | | | 42594 | 36426 | 1.07765 | 42256 |
| | XLT & LO-STRESS WITH MOD. GROOVE 4.656" MIN. DIA. | 5 | 44949 | 1.87 | GROOVE O.D. | 2.379 | 2660.7 | 48078 | 41116 | 0.93492 | 41332 |
| | | | 40915 | 17.41 | O.D. | | | 40831 | 34919 | 1.00205 | 37622 |
| BOX | XLT & LO-STRESS WITH MOD. GROOVE 4.656" MIN. DIA. | 5 | 43979 | 3.07 | GROOVE O.D. | 2.283 | 2669.2 | 46265 | 39566 | 0.95059 | 42139 |
| | | | 40549 | 18.47 | O.D. | | | 39063 | 33407 | 1.03805 | 38853 |

PURE BENDING 200,000 IN-LB BENDING MOMENT

| CONNECTOR | | MODEL NO. | MAXIMUM STRESS (PSI) | LOCATION OF STRESS FROM TONG-SPACE (IN) | LOCATION | DISPLACEMENT AT END OF PIPE (IN) | ROTATION AT END OF PIPE (DEG) | SCF | STRESS FOR 3 DEG/10FT (PSI) |
|---|---|---|---|---|---|---|---|---|---|
| PIN | XLT ONLY | 1 | 35184 | 15.29 | O.D. | 2.704 | 2.872 | 1.004 | 39039 |
| | XLT & LO-STRESS WITH GROOVE 4.625" MIN. DIA. | 2 | 40873 | 2.70 | GROOVE O.D. | 2.668 | 2.850 | 1.166 | 45957 |
| | XLT & LO-STRESS WITHOUT GROOVE | 3 | 35184 | 17.79 | O.D. | | | 1.004 | 39561 |
| | XLT & LO-STRESS WITHOUT GROOVE API 3-9/16" UPSET, 2.5 TAPER LENGTH, 2 TAPER RADIUS | 3 | 35184 | 17.80 | O.D. | 2.646 | 2.838 | 1.004 | 39892 |
| | | 4 | 35611 | 9.74 | O.D. | 2.799 | 2.925 | 1.016 | 38170 |
| | | | 37818 | 8.37 | I.D. | | | 1.079 | 40536 |
| | XLT & LO-STRESS WITH MOD. GROOVE 4.656" MIN. DIA. | 5 | 32645 | 1.87 | GROOVE O.D. | 2.690 | 2.862 | 0.932 | 36402 |
| | | | 35184 | 17.82 | O.D. | | | 1.004 | 39233 |
| BOX | XLT & LO-STRESS WITH MOD. GROOVE 4.656" MIN. DIA. | 5 | 32243 | 3.00 | GROOVE O.D. | 2.532 | 2.773 | 0.920 | 38203 |
| | | | 35184 | 18.83 | O.D. | | | 1.004 | 41687 |

MC/1 STRESS IN PIPE AT 200,000 IN-LB = 35,040.609 PSI

It can be seen that the modified design produced a considerable stress reduction. Stress in the modified groove dropped 11,428 psi for pins and 12,398 psi for boxes with the cantilever FEA. In pure bending, the stress dropped 8,228 psi for pins and 8,630 psi for boxes. In the cantilever FEA, the stresses at the fadeout dropped 966 psi in pins and 1,332 psi in boxes when compared to the XLT long taper upset. These stress reductions should add considerable fatigue life to the drill pipe.

Table 7 that follows are the preferred dimensions for the modified stress relief groove of this invention.

TABLE 7

| DRILL PIPE SIZE, WT., TYPE UPSET & I.D. | UPSET I.D. | PRIDECO LO-STRESS UPSET O.D. | DIA. AT BOTTOM OF GROOVE | GROOVE DEPTH | WALL THICKNESS UNDER GROOVE |
|---|---|---|---|---|---|
| 4", 14 lbs./ft., IU, I.D. = 3.340" | 2 7/16 | 4 3/16 | 3.7365 | 0.2255 | 0.6495 |
|  | 2 9/16 | 4 3/16 | 3.8192 | 0.1842 | 0.6283 |
| 4", 15.70 lbs./ft., IU, I.D. = 3.240 | 2 7/16 | 4 3/16 | 3.8795 | 0.1540 | 0.7210 |
| 4 1/2", 16.60 lbs./ft., IEU, I.D. = 3.826" | 3 | 4 11/16 | 4.2767 | 0.2054 | 0.6384 |
|  | 3 1/8 | 4 11/16 | 4.3653 | 0.1600 | 0.6201 |
| 4 1/2", 20.0 lbs./ft., IEU, I.D. = 3.640" | 2 1/2 | 4 11/16 | 4.2236 | 0.2320 | 0.8618 |
|  | 2 3/4 | 4 11/16 | 4.3763 | 0.1556 | 0.8132 |
| 5", 19.50 lbs./ft., IEU, I.D. = 4.276 | 3 1/4 | 5 1/8 | 4.6563 | 0.2344 | 0.7032 |
|  | 3 1/2 | 5 1/8 | 4.8341 | 0.1455 | 0.6671 |
| 5", 25.60 lbs./ft., IEU, I.D. = 4.000" | — | — | — | N/A | — |
| 5 1/2", 21.9 lbs./ft., IEU, I.D. = 4.778" | 3 3/4 | 5 11/16 | 5.1330 | 0.2773 | 0.6915 |
|  | 4 | 5 11/16 | 5.3184 | 0.1846 | 0.6592 |
| 5 1/2", 24.7 lbs./ft., IEU, I.D. = 5.670" | 3 3/4 | 5 11/16 | 5.2950 | 0.1963 | 0.7725 |
| 6 5/8", 25.2 lbs./ft., IEU, I.D. = 5.965" | 5 1/8 | 6 57/64 | 6.3260 | 0.2823 | 0.6000 |
|  | 5 1/4 | 6 57/64 | 6.4279 | 0.2314 | 0.5889 |
|  | 5 5/16 | 6 57/64 | 6.4790 | 0.2058 | 0.5833 |
|  | 5 3/8 | 6 57/64 | 6.5304 | 0.1801 | 0.5777 |
| 6 5/8", 27.70 lbs./ft., IEU, I.D. = 5.901" | 5 1/8 | 6 57/64 | 6.4246 | 0.2330 | 0.6500 |
|  | 5 1/4 | 6 57/64 | 6.5247 | 0.1829 | 0.6374 |

Since it is clear from TABLE 6 that the stress in the pin is higher than the stress in the box, in a further effort to reduce the stress in tool joint pins, pin 110 in FIG. 9 is provided with taper 114 of 18° rather than 35°. Since the thick wall section of a pin is shorter than the thick wall section of a box, stress relief groove 116 does not have a cylindrical center section. Instead curved section 116, which is an extension of the radius of curvature between tapered section 114 and weld neck 118, forms one end of the groove and curved section 117, which is a continuation of curved section 116, forms the other end of the groove. Preferably, $R_2$ is about 2½ inches.

Another advantage of the pin of FIG. 9 is that it can be run "pin-up". Today, drill pipe is run this way under certain circumstances. See Dudman U.S. Pat. No. 4,760,889.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. In a joint of drill pipe having a tube section with upset ends to increase the wall thickness of the tube at its ends and tool joints connected to each end of the tube, each tool joint having a cylindrical section connected to a weld neck of smaller diameter by a tapered section, said connection between the tapered section and the weld neck having a radius of curvature, said weld neck having a wall thickness equal to that of the upset end of the tube that is welded to the weld neck, the improvement comprising an external, stress relief groove in the weld neck to increase the fatigue life of the tube section of the drill pipe when the drill pipe is subjected to varying stresses produced by rotating the drill pipe while bent, one end of the relief groove being arcuate and an extension of the radius of curvature between the tapered section and the weld neck.

2. The drill pipe joint of claim 1 in which the cross-sectional area of the tool joint weld neck under the cylindrical portion of the groove is greater than the cross-sectional area of the tube section of the pipe.

3. The drill pipe joint of claim 1 in which the cross-sectional area under the groove is about 1.6 times the cross-sectional area of the tube.

4. The drill pipe of claim 1 in which the other end of the stress relief groove is arcuate and the section in between the arcuate ends is cylindrical.

5. The drill pipe joint of claim 4 in which the arcuate sections at each end of the cylindrical section have radii of about 2½ inches.

6. The drill pipe joint of claim 5 in which the tool joint is a box and the taper between the tool joint and the weld neck is 18°.

7. The drill pipe joint of claim 5 in which the tool joint is a pin and the taper between the tool joint and the weld neck is 35°.

8. The drill pipe of claim 5 in which the tool joint is a pin and the taper between the tool joint and the weld neck is 18°.

9. In a tool joint for drill pipe having a cylindrical section and a weld neck section of smaller diameter that is connected to the cylindrical section by a tapered section, said weld neck having a wall thickness equal to that of the tube end to which the tool joint is to be welded, the improvement comprising an external, stress relief groove in the weld neck between the weld and the tool joint to increase the fatigue life of the tube section of the drill pipe when the drill pipe to which the tool joint is connected is subjected to varying stresses produced by rotating the drill pipe while bent, said groove having a cylindrical middle section and arcuate end sections.

10. The tool joint of claim 9 in which the cross-sectional area of the tool joint weld neck under the groove is greater than the cross-sectional area of the non-upset section of the tube to which it is to be welded.

11. The drill pipe tool joint of claim 9 in which the cross-sectional area under the groove is about 1.6 times the cross-sectional area of the tube to which it is to be welded.

12. The drill pipe tool joint of claim 9, 10, or 11, in which the arcuate end section adjacent the tapered section of the tool joint is an arcuate extension of the tapered section.

13. The drill pipe tool joint of claim 9 in which the arcuate ends have a radius of curvature of about 2.5 inches.

* * * * *